US007358435B2

(12) United States Patent
Ladie' et al.

(10) Patent No.: US 7,358,435 B2
(45) Date of Patent: Apr. 15, 2008

(54) ELECTRIC POWER TRANSPORT SYSTEM COMPRISING A COLD DIELECTRIC SUPERCONDUCTING CABLE

(75) Inventors: Pierluigi Ladie', Milan (IT); Valter Castiglioni, Magenta (IT); Marco Nassi, Turin (IT)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 373 days.

(21) Appl. No.: 10/498,912

(22) PCT Filed: Dec. 17, 2001

(86) PCT No.: PCT/IB01/02501

§ 371 (c)(1),
(2), (4) Date: Nov. 8, 2004

(87) PCT Pub. No.: WO03/052775

PCT Pub. Date: Jun. 26, 2003

(65) Prior Publication Data

US 2005/0056456 A1    Mar. 17, 2005

(51) Int. Cl.
*H01B 12/00* (2006.01)
*H01R 4/68* (2006.01)
*H02G 15/34* (2006.01)

(52) U.S. Cl. .................... 174/15.4; 505/230
(58) Field of Classification Search ............. 174/15.4, 174/15.5; 505/230–232
See application file for complete search history.

(56) References Cited

U.S. PATENT DOCUMENTS 3,453,716 A * 7/1969 Cook ..................... 29/421.1
3,781,455 A * 12/1973 Hildebrandt ............. 174/15.4
3,902,000 A * 8/1975 Forsyth et al. ............ 174/15.3
3,946,141 A * 3/1976 Schmidt ................... 174/11 R
3,959,576 A * 5/1976 Penczynski et al. ....... 174/15.3
4,046,407 A   9/1977 Porreco
5,120,705 A * 6/1992 Davidson et al. ......... 505/220
6,936,771 B2 * 8/2005 Sinha et al. ............. 174/125.1

FOREIGN PATENT DOCUMENTS

DE    38 11 051 A1    10/1989

OTHER PUBLICATIONS

Della Porta, P., "Gettering—an Integral Part of Vacuum Technology", American Vacuum Society, 39th National Symposium, Technical Paper TP 202, 11 pages.
Engelhardt, J. S. et al., "Application Considerations for HTSC Power Transmission Cables", Fifth Annual Conference on Superconductivity and Applications, Sponsored by NYSIS, Buffalo, NY, (Sep. 24-26, 1991).
Hara, T. et al., "Feasibility Study of Compact High-TC Superconducting Cables", IEEE Transactions on Power Delivery, vol. 7, No. 4, pp. 1745-1753, (Oct. 1992).

* cited by examiner

*Primary Examiner*—Jeremy C Norris
(74) *Attorney, Agent, or Firm*—Finnegan, Henderson, Farabow, Garrett & Dunner, L.L.P.

(57) ABSTRACT

Electric power transport system having a cold dielectric superconducting cable, a cryostat and a cryogenic fluid. The cryostat has modules including an inner tube, an outer tube, a couple of gaskets, and a duct connected to the coupling surface between the gaskets of at least one flange with the environment external to the cryostat.

22 Claims, 6 Drawing Sheets

ELECTRIC POWER TRANSPORT SYSTEM COMPRISING A COLD DIELECTRIC SUPERCONDUCTING CABLE

CROSS REFERENCE TO RELATED APPLICATION

This application is a national phase application based on PCT/IB01/02501, filed Dec. 17, 2001, the content of which is incorporated herein by reference.

BACKGROUND OF THE INVENTION

1. Field of the Invention

The present invention relates to an electric power transport system comprising a cold dielectric superconducting cable.

2. Description of the Related Art

The term "superconducting cable" denotes a cable for transmitting current in conditions of so-called superconductivity, i.e. in conditions of almost null electric resistance. See, for example, Engelhardt J. S. et al., Application Consideration for HTSC Power Transmission Cable, 5th Annual Conference on Superconductivity and Application, Buffalo, N.Y., Sep. 24-26, 1991. In particular, the term "cold dielectric superconducting cable" indicates a cable showing two concentric phases (conductor and return) in superconducting material, electrically isolated one from the other by a dielectric kept at very low temperature. Such a cable shows an inner channel wherein a cryogenic fluid flows under high pressure.

The above said cable is included in a container with a tubular section, known as cryostat. In the channel externally circumscribed by said cryostat, where the cable is, a cryogenic fluid flows under high pressure (typically, the same fluid flowing into the inner channel of the cable), while the body of said cryostat comprises two coaxial tubes delimitating a gap kept under vacuum wherein, preferably, a thermal insulator is provided.

The term "superconducting material" indicates a material, e.g. special ceramics based on mixed oxide of copper, barium and yttrium (generally known as YBCO), or of bismuth, lead, strontium, calcium and copper (generally known as BSCCO), comprising a superconductive phase with substantially null resistivity at temperature values equal of lower a threshold value, defined as critical temperature ($T_c$). For example, for the material mentioned above, the $T_c$ ranges from about 60 K (−213° C.) and about circa 170 K (−103° C.).

The operative temperature of a superconducting cable is lower than the critical temperature of the superconducting material contained therein, so as to guarantee a safety margin in case of disfunctioning of the structures for setting and maintaining the proper thermal conditions. These structures mainly include a cryogenic fluid flowing into one or more channels, and a cryostat.

Generally, the cryogenic fluid is helium, nitrogen, hydrogen, argo or mixture thereof, at the liquid or gaseous state, and operates at temperature and pressure specific for the application. Typically, said cryogenic fluid is used under pressure for compensating the pressure fall along the cable length, and for ensuring the right operative temperature. In the case of liquid nitrogen, the temperature under which it is kept is of about 15 atm (about 15,200 mbar).

As already said, the cryostat generally comprises two coaxial tubes, and between them a gap under vacuum is present, preferably at least partially filled with a thermal insulator. A general description on the cryostats used in this field is provided by IEEE TRANSACTIONS ON POWER DELIVERY, vol. 7, No. 4, October 1992, page 1745-1753.

One of the problems associated to the operation of this kind of cable just relates to the maintenance of the vacuum inside said gap of the cryostat The vacuum level suitable for ensuring the cryostat efficiency is rather high, of about $10^{-6}$-$10^{-5}$ mbar. As said above, the cryostat externally delimitates a channel where the cryogenic fluid is made to flow under pressure. Thus, there is a great pressure difference (ΔP) between said channel and said gap. This great pressure gap represents a critical point of high importance in view of the following.

SUMMARY OF THE INVENTION

Technological and logistical reasons, such as the impracticability of making, transporting and/or mounting rigid cryostat of remarkable length, for example longer than 20 m, make necessary to produce the cryostat in modules of limited length (for example, about 5 m long), which are connected each other in the site of the cable emplacement.

The Applicant took into consideration the possibility of accomplishing the connection among cryostat modules by means of welding or gaskets.

Though, as for welding, many safety norms concerning apparatus under pressure require a final test based on in carrying out a hydraulic trial by putting the apparatus under water pressure. In the present case, this implies to drive water under pressure (obviously in the absence of the cable) along a whole line, e.g. one-kilometer long, for effecting the test of all the weldings made in the plant. It implies a noticeable outflow of energy, time and economical investment.

As well according to some safety provisions, each welding for under pressure apparatus has to be verified and certified by means of radiography. This entails additional expenses and longer setting up times for the plant, too.

The use of gaskets allows avoiding the hydraulic test on the set plant, besides the radiographic validation, obviously, thus the sole individual check of each single module in the factory is left necessary. But this solution implies drawbacks, too. Each gasket is characterized by a loss value mainly depending on the kind and material of the gasket itself, on the pressure, temperature and kind of fluid that it has to restrain.

In the specific case of a superconducting cable, the Applicant perceived that the parameter more harmful for the gasket seal is the pressure. As already said above, the pressure difference between the under vacuum gap of the cryostat and the cryogenic fluid flowing channel is particularly high, for example of about 16,000 mbar, being of about $10^{-6}$-$10^{-5}$ mbar in the cryostat and of about 15,000 mbar (when liquid nitrogen is used) in the flowing channel. In the cable in question the yielding of a gasket implies cryogenic fluid infiltration inside the under vacuum gap containing, in many cases, thermal insulating material, causing vacuum loss, thus damaging the cryostat efficiency, and possible impairment of said thermal insulator.

The Applicant perceived that the problem of controlling such a pressure difference might be solved with a system apt to limit the cryogenic fluid leakages from the flowing channel, and to prevent the infiltration of such leakages into said under vacuum gap. Said system ensures the vacuum preservation inside the cryostat, and avoids the damaging of the thermal insulator. Moreover, the Applicant perceived that the advantages provided by said system are partly related to the fact of subdividing the pressure difference between the internal volume of the cryostat and the cryogenic fluid flowing channel into two different gradients.

In particular, the Applicant found that interposing between two cryostat modules at least two gaskets arranged one inside the perimeter of the other, and connecting the zone between said at least two gaskets with the environment external to the cryostat, the potential cryogenic fluid leakages from the flowing channel are brought outside the cryostat, thus preventing the risk of infiltrations of said fluid in said cryostat gap causing vacuum loss.

In addition, the presence of at least two gaskets subdivides the total pressure difference applied between said under vacuum gap and said cryogenic fluid flowing channel in at least two gradients, thus decreasing the force applied on the inner gasket, with benefit for the seal and reliability of the same.

Therefore, in a first aspect the present invention relates to an electric power transport system comprising
  at least a cold dielectric superconducting cable including two concentric phases of superconducting material (22, 26), electrically isolated one from the other by a dielectric (25a-c), and a first cryogenic fluid flowing channel (24) inside the cable,
  a cryostat circumscribing a cryogenic fluid flowing channel (28), said channel (28) containing said cable; and
  a cryogenic fluid, said cryostat comprising at least two modules, each comprising
  an inner tube (1), having at least a coupling flange (8a, 8b) for said at least two modules, extending in a radially external direction,
  an outer tube (2), having length not greater than the length of said inner tube (1), wherein at least one of said modules comprises
  at least a radially inner gasket (20) and at least a radially outer gasket (19) on the coupling surface of said at least one flange (8a, 8b), the radially external perimeter of the inner gasket being spaced from the radially internal perimeter of the outer gasket, and
  at least a duct (21) having a first end in connection to said coupling surface of said at least one flange (8a, 8b), comprised between said gaskets (19, 20), and a second end in connection to the environment external to the cryostat.

In particular, said inner and outer tubes are associated by spacer, preferably in a number of two, substantially adjacent to extremities of at least said outer tube. Between said inner and outer tube a gap is defined which, under operative conditions, is kept under vacuum, e.g. at a pressure of about $10^{-6}$-$10^{-5}$ mbar.

Preferably said at least one radially inner and radially outer gasket are housed in a slot. Still more preferably they are put each in a corresponding slot, respectively radially inner and outer, the radially outer diameter of the inner slot being smaller than the radially inner diameter of the outer slot.

In an embodiment of the invention, both the flanges of the inner tube have said at least one slot.

Preferably, said duct is spirally wound around the diameter of said inner tube.

In a second aspect, the present invention relates to a cryostat for cold dielectric superconducting cable, comprising at least two modules as described above, reciprocally coupled.

As said outer tube of a modules may show a length smaller than that of the inner tube, the coupling of two modules by connecting the inner tubes creates an intermediate space radially external to said inner tubes, which, during the cryostat assemblage, is open in correspondence to said outer tubes. A sleeve axially moving on said outer tube closes said intermediate space.

Said sleeve may be fixed in operative position by weldings. As an alternative, both said external tube and said sleeve may be suitably radially flanged. In such a case, the closing of said intermediate space is made by moving said flanged sleeve so as to meet the flanges of said outer tube. This embodiment is preferred by the present invention. Between one flange of said sleeve and the corresponding one of said tube at least one gasket is placed, which can be of the two-half type.

Said intermediate space is put under vacuum like already indicated above for said gap comprised between said inner and outer tube.

BRIEF DESCRIPTION OF THE DRAWINGS

Further features and advantages will become more apparent from a detailed description of a preferred, but not exclusive, embodiment of a system and a cryostat in modules according to the present invention. Such description is hereinbelow reported with reference to the enclosed figures provided for indicative purpose only and thus non restricting, wherein.

Figure 1:
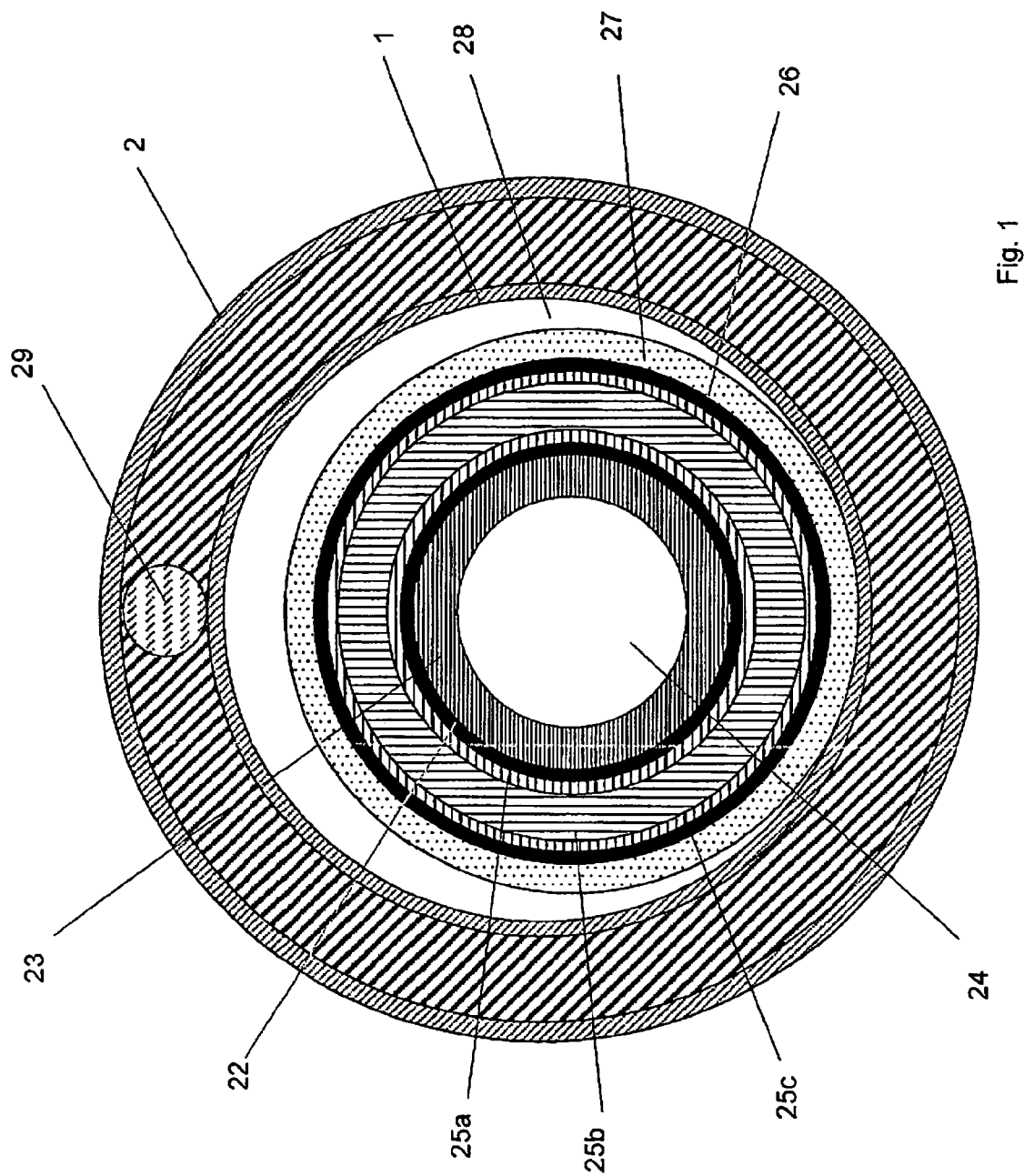
FIG. 1 shows a transversal section of a cold dielectric superconducting cable.

For illustration plainness, the figures (excepting for FIG. 1) do not show the thermal insulator possibly present in gaps, intermediate spaces and around the ducts of the depicted modules.

DETAILED DESCRIPTION OF THE INVENTION

A cold dielectric superconducting cable (FIG. 1) generally comprises one or more layers of superconducting material (22) forming the so-called phase conductor, placed on a former (23), generally tubular, delimiting a first cryogenic fluid flowing channel (24). External to said superconducting material a dielectric is provided, comprising an electrostatic shield (25a), electric insulating material (25b) and a second electrostatic shield (25c). Around said dielectric one or more layers of superconducting material (26) are placed to form the so-called return conductor. On its turn, said return conductor is covered by a coating (27) of material suitable to provide mechanical resistance and impermeability against the cryogenic fluid. The above said cable is contained in a channel (28) delimited by the cryostat as explained below.

The wall externally circumscribing said channel (28) is formed by a cryostat comprising an inner tube (1) and an outer tube (2) delimiting an under vacuum gap (3), typically at an absolute pressure of about $10^{-6}$-$10^{-5}$ mbar and, preferably, containing thermal insulating material (29).

Figure 2:
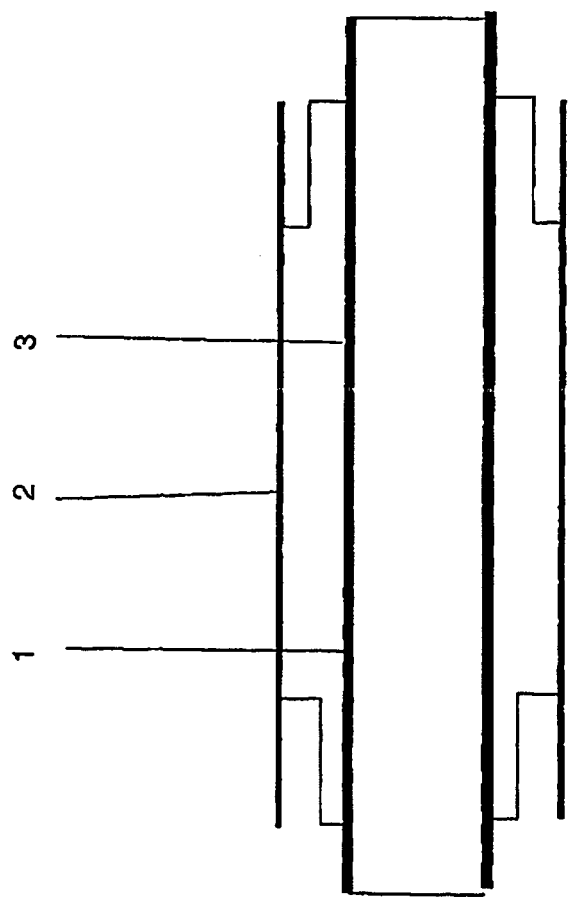
FIG. 2 schematically represents a longitudinal section of a cryostat module.

In FIG. 2 a cryostat module is schematically shown. Said inner (1) and outer (2) tubes are generally in glass fiber or stainless steel, the latter being preferably corrugated to impart flexibility to the structure. The reference number (3) indicates the gap already illustrated above.

Figure 3:
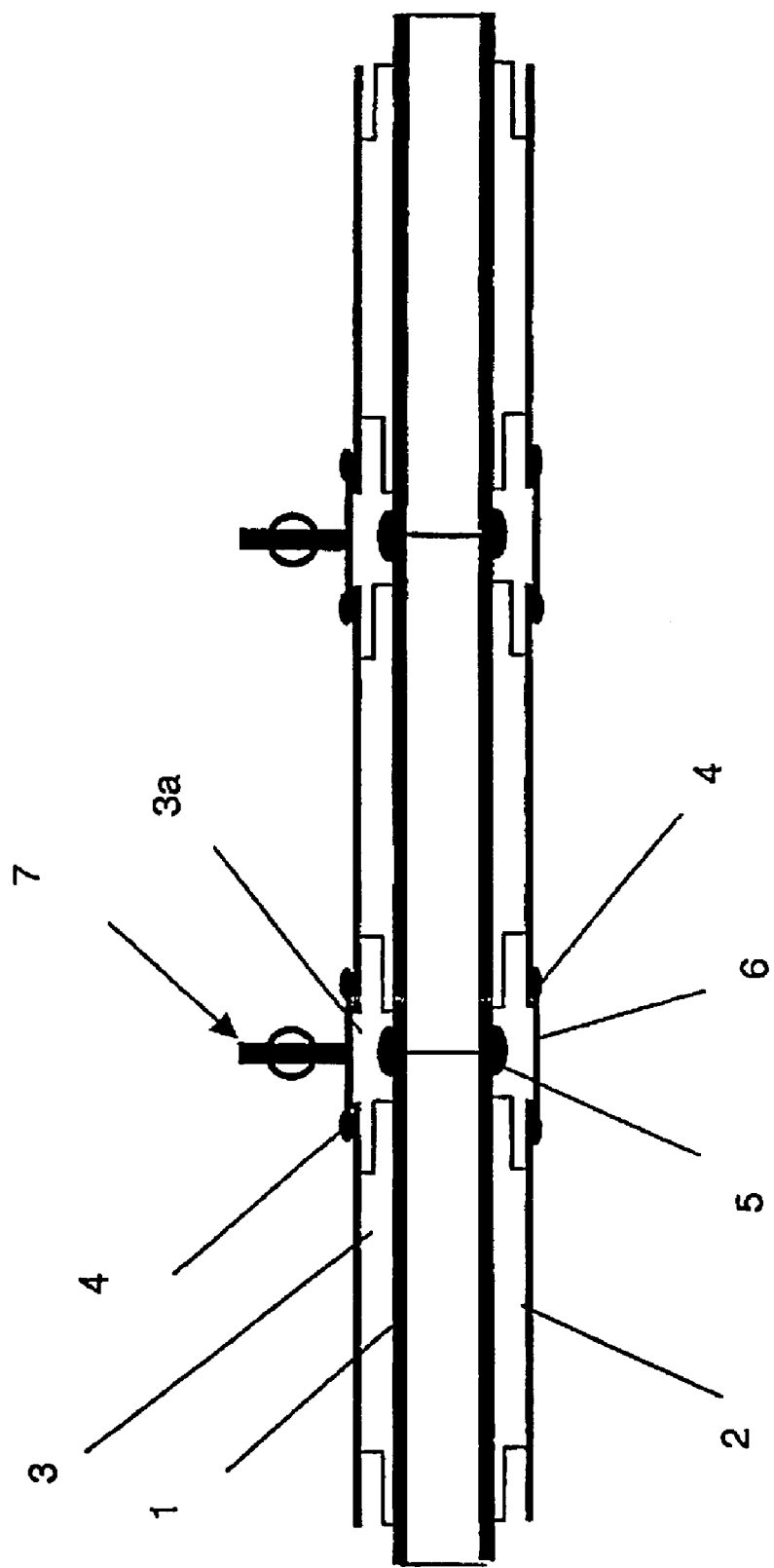
FIG. 3 represents a longitudinal section of three modules of cryostat coupled by welding.

FIG. 3 shows three cryostat modules coupled by welding. The inner tubes (1) are coupled by welding (5), the outer tubes (2) are coupled through a sleeve (6) fixed at its extremities by welding (4). After welding, vacuum is created by a valve (7) connected to an external pumping system, in the intermediate space (3a) formed by coupling the inner tubes and welding said sleeve (6) to said outer tubes of two modules (hereinafter "intermediate space"), optionally containing thermal insulator.

Figure 4:
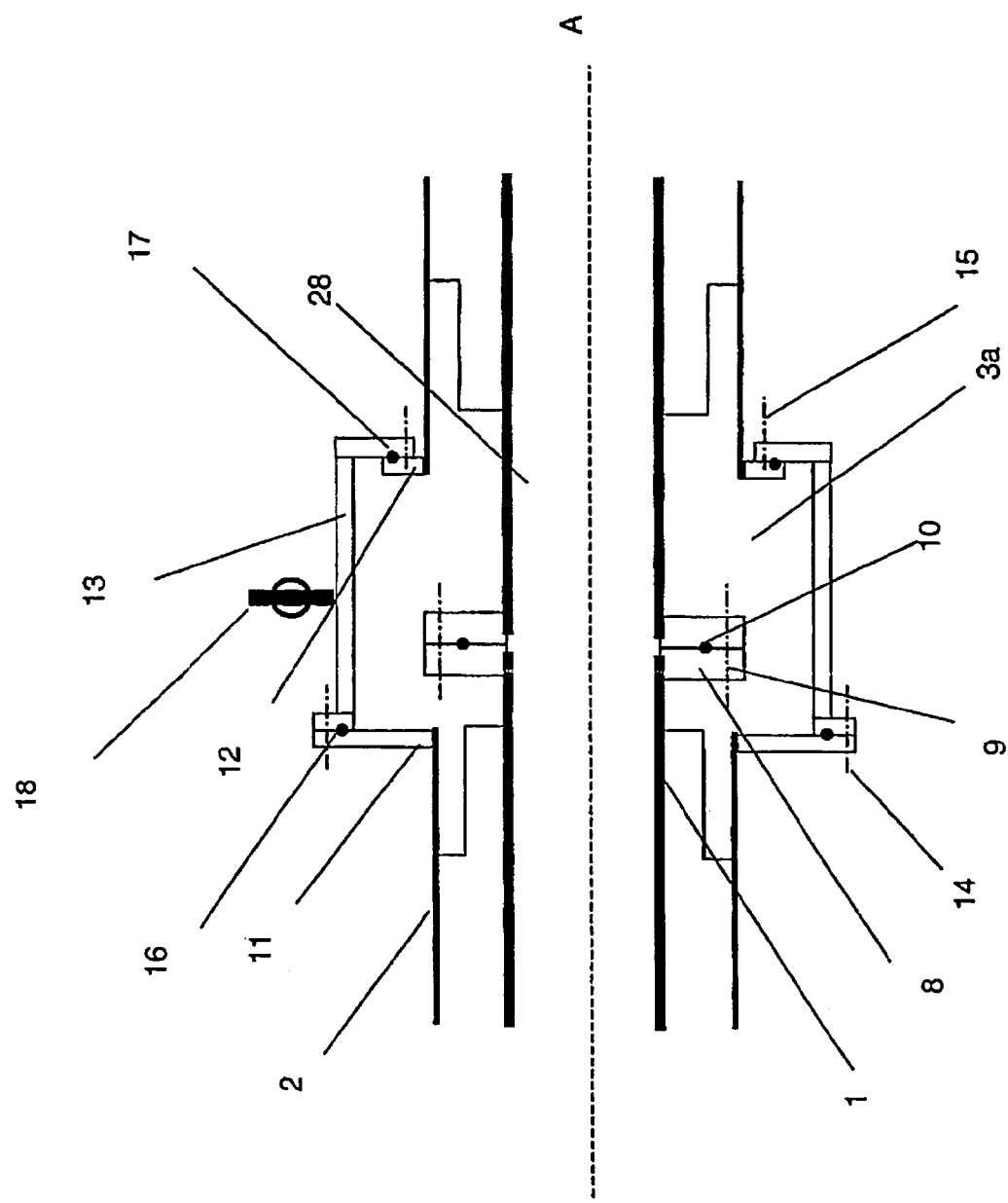
FIG. 4 represents a longitudinal section of two modules of cryostat coupled by fasteners and gaskets.

FIG. 4 shows the coupling of two cryostat modules (only partially illustrated) by only one gasket on the inner tube flange. The inner tubes (1) have flanges (8), coupled by fasteners (9), typically nuts and bolts, while a gasket (10) achieves the seal. The outer tubes (2) have flanges (11) and (12), coupled to the flanged sleeve (13) by fasteners (14) e (15), while the seal is made by gaskets (16) and (17). The intermediate space (3a) optionally contains thermal insulator and is put under vacuum though the valve (18), connected to an external pumping system.

Said gasket (10) is that appointed to bear the higher pressure difference, as it is at the interface between channel (28), where the cryogenic fluid flows under pressure, e.g. at about 15,000 mbar, and the intermediate space (3a) under vacuum at about $10^{-6}$-$10^{-5}$ mbar.

For making the vacuum in short time, said intermediate space (3a) is as small as possible. However, it implies that an even minimal leak by gasket (10) may break the vacuum even more rapidly, taking into account the pressure thrust exerted by the cryogenic fluid. The latter infiltrates into said intermediate space (3a) causing the vacuum breakage and, in case, the harm of the thermal insulator. This situation calls for frequent repairing, even monthly, on the cryostat to reestablish the vacuum and, in case, to substitute the thermal insulator which may be impaired by the infiltration of a fluid at a temperature well lower than −100° C.

The system of the present invention achieves many advantages, as it becomes more apparent from the following description.

Figure 5:
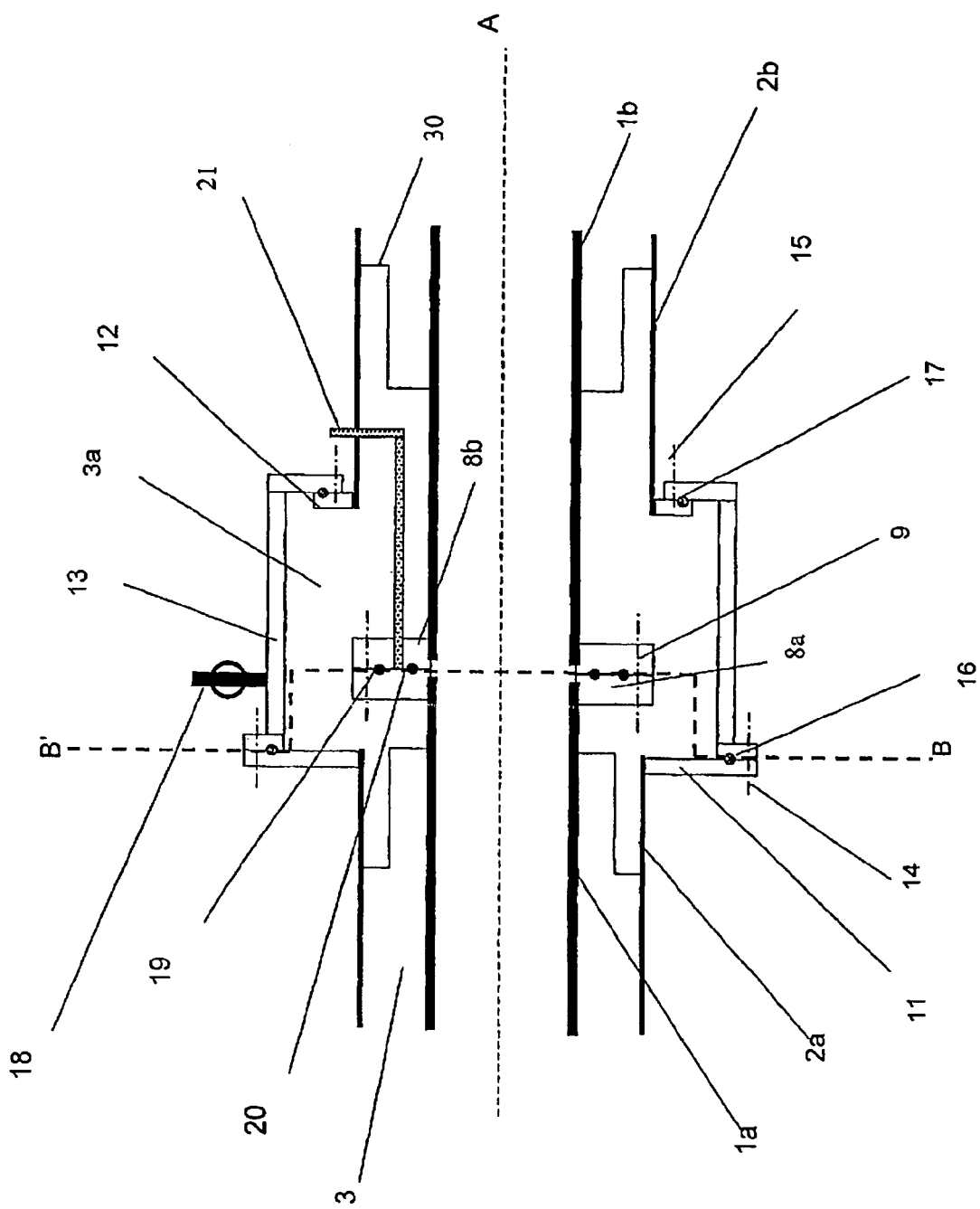
FIG. 5 represent a longitudinal section of two modules of cryostat according to the present invention.

FIG. 5 shows two cryostat modules according to the present invention wherein the relevant structures are separated by the broken line B-B'. Each of them comprises an inner tube (1), and outer tube (2), in this case both being flanged in radially external direction according to a preferred embodiment of the invention, and a pair of spacers (30), preferably placed near the extremities of at least said outer tube (2), preferably of both said tubes, which altogether delimitate a gap (3) which is only partially sketched for both the modules, in figure. As said above, said gap (3) is kept under vacuum, e.g. at a pressure of about $10^{-6}$-$10^{-5}$ mbar.

Preferably, said gap (3) contains thermal insulating material selected, e.g., among polyester resin tapes, polytetrafluoroethylene fibers and metallized Mylar® (DuPont Teijin Films trademark). Furthermore, getters (i.e. gas absorbers made of sintered powder of, e.g., zirconium or titanium; see, for example, della Porta P., "Gettering—an Integral Part of Vacuum Technology", American Vacuum Society, $39^{th}$ National Symposium, technical sheet TP 202) or zeolites may be placed in said gap.

Said outer tubes (2a) and (2b) have, respectively, flanges (11) and (12), preferably radially external, showing slots for, respectively, gaskets (16) and (17). In the illustrated case said gaskets are O-ring, one each flange. These gaskets are apt to guarantee the vacuum inside the intermediate space (3a) delimited by, besides said spacers (30) a sleeve (13) too, which, in the present case, is suitably flanged to couple to the flanges (11) and (12) by fasteners (14) and (15).

The inner tubes (1a) and (1b) show, respectively, flanges (8a) and (8b), at the looking out extremities thereof.

Figure 8:
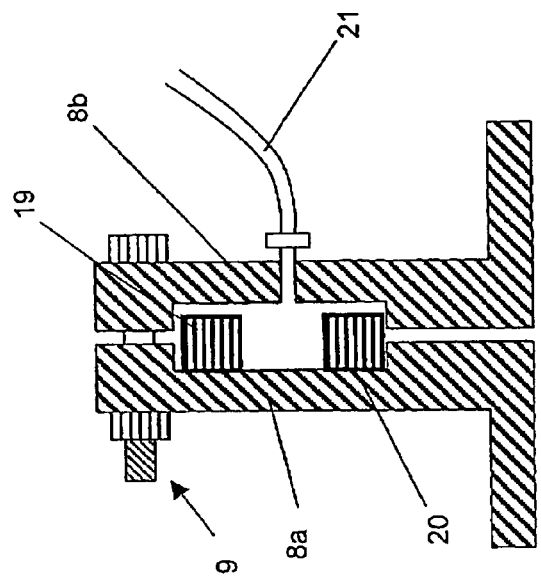
FIGS. 7, 8 and 9 show, in right longitudinal section, a particular of inner tube flanges associated according three different embodiments of the present invention.
Figure 7:
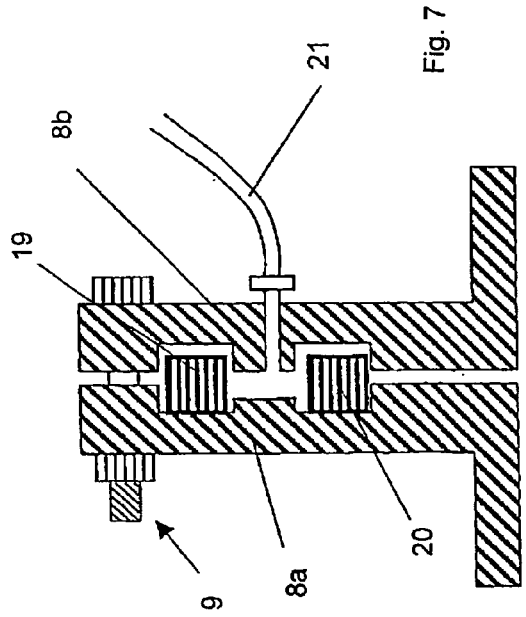
Figure 9:
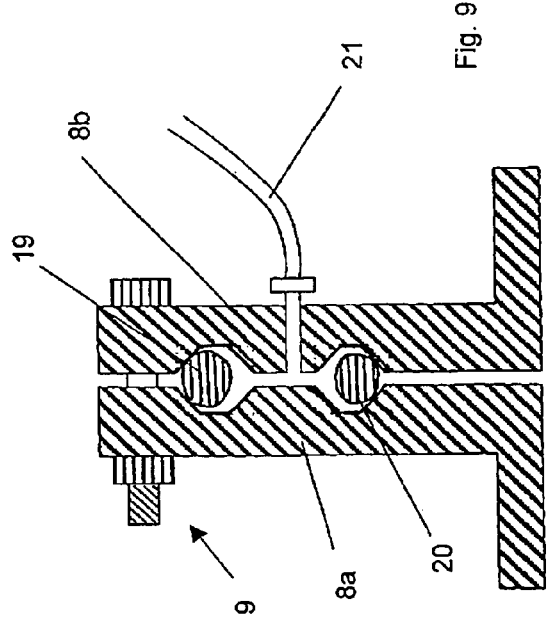

Preferably, in at least one of said flanges (8a, 8b) at least one slot is made up for housing at least a pair of gasket (19, 20), as illustrated in FIGS. 7, 8 and 9. Said gaskets (19, 20) are placed one inside the other, suitably spaced. Said at least one slot may have a rectangular right section with the greater dimension radially oriented (FIG. 8); radially inner gasket (20) leans on the radially inner minor side of said slot, while the radially outer gasket (19) is in contact with the radially outer minor .side of said slot. Between the radially internal perimeter of the outer gasket (19) and the radially external perimeter of the inner gasket (20), the slot may show an axially oriented projection (FIG. 7) reducing the axial depth of this zone, up to minimize it, in case, as the slit remaining between the axially looking out surfaces of the flanges, pressed against the gaskets, is sufficient to evacuate the fluid possibly infiltrating in said slit, as illustrated below. In this variant, the slot is subdivided into two slots, respectively radially inner and radially outer. In this case, the slots may be present one for each flange, too.

FIG. 9 shows an alternative embodiment wherein the profile in longitudinal right section of at least one slot is rhomboidal, suitable for containing an O-ring type gasket. A slot wherein the profile in longitudinal right section is triangular is likewise suitable for this type of gaskets.

Figure 6:
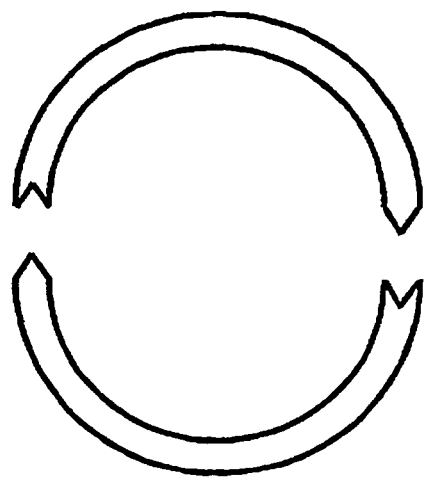
FIG. 6 schematically shows a two-half type gasket.

In the present case, both said flanges (8a, 8b) have two slots for housing the gaskets (19) and (20). The gaskets (19) and (20) are preferably of the two-half type, schematically illustrated in FIG. 6. For example, they are in Grafoil®, Graftech Inc. trademark indicating a so-called flexible graphite containing more than 98% by weight of elemental carbon; even more preferably, they are reinforced by one or more foils in stainless steel.

The radially outer diameter of the inner slot is smaller than the radially inner diameter of the outer slot. At least one of said slots may have a substantially triangular or rhomboidal right axial section.

Moreover, flange (8b) shows a through hole comprised between the gaskets (19, 20), which a first end of the duct (21) is connected to.

Preferably, said duct (21) is a metal duct, preferably flexible; even more preferably it is in corrugated stainless steel. Preferably, it has a diameter smaller than 10 mm, more preferably smaller than 4 mm.

The second end of the duct (21) is in contact with the environment external to the cryostat by, in the present case, a second through hole made in one of said outer tubes (2a, 2b). Said duct (21) is preferably helicoidally wound around said inner tube (1). This pattern, though preferred according to the invention, is not herein specifically shown. However, the design of such winding is easily perceivable by a technician in the art. The coating of said duct (21) with a thermal insulating material selected, e.g., among those already listed above for the filling of said gap (3), is likewise not shown and preferred by the present invention.

In a preferred embodiment of the present invention, the inside of said duct (21) is under room pressure (1 atm, equal to about 1,013 mbar). The second end of said duct (21) is preferably provided with a moisture trap, for example of the calcium chloride type.

In a different embodiment, it is filled with a fluid, e.g. nitrogen, slightly overpressure (for example at 1.01 atm equal to about 1,023 mbar). In such case, at said second end a unidirectional breathing valve is provided set at a pressure value such as it opens and releases said fluid when the pressure inside said duct (21) exceed the established overpressure. The valve closes up when the pressure inside said duct goes back to the set value.

Flanges (8a) and (8b) are fixed one to the other by fasteners (9), e.g. the already mentioned nuts and bolts or equivalent devices.

The assembling procedure of the system of the present invention entails, firstly, the in-axis positioning of two cryostat modules. Said gaskets (19) and (20) are neutrally housed on the coupling surface of said flange (8a) or (8b), preferably in slots present in one flange or in the other. In the present case, said flange (8b) is provided with a through hole, but this may be alternatively provided in the flange (8a). Said gaskets (19) are (20) are engaged by reciprocally contacting flanges (8a, 8b) of the relevant modules, and fixing then with fasteners (9).

The compression exerted by said flanges (8a) and (8b) on said gaskets (19) and (20) ensures, under operative conditions, the fluid seal in the channel (28) and the preservation of the vacuum in the intermediate space (3a).

The fixing of the sleeve (13) is then carried out. This action may be preceded (and this is a preferred embodiment of the present invention) by a filling phase of said intermediate space (3a) with thermal insulating material, e.g. of the already above cited type, and optionally with getters or zeolites.

As just illustrated above, said sleeve (13) may be fixed by welding or gaskets. The second case is illustrated in FIG. 5. Gaskets (16) and (17) are housed, respectively, in flanges (11) and (12) for outer tubes (2a) and (2b), and the sleeve (13), flanged in this case, is positioned in association thereto and fixed by fasteners (14) and (15).

Preferably, the second end of the duct (21) is in communication with the environment external to the cryostat by a second through hole made in said outer tube (2), and joined to said hole by welding.

The vacuum inside the intermediate space (3a) is then created by the valve (18), connected to an external pumping system. Said vacuum is of about $10^{-6}$-$10^{-5}$ mbar.

The system according to the invention ensures a constant vacuum seal under the particularly problematic conditions, which a superconducting cable operates at. Actually, the present invention provides a method for maintaining a predetermined residual pressure in a cryostat in modules for cold dielectric superconducting cable, method comprising the phase of conveying outside said cryostat infiltrations of cryogenic fluid coming from said flowing channel.

As just said above, the more critical zone from the cryostat efficiency viewpoint is that interfacing the cryogenic fluid flowing channel, i.e. that in association with the cryostat inner tube. Gaskets placed at such interface have to bear a noticeable pressure difference, like that mentioned above ($10^{-6}$-$10^{-5}$ mbar versus, e.g. 15,000 mbar, in the case of liquid nitrogen, i.e. a ΔP of about 16,000 mbar). The failing of a gasket in this zone causes not only the vacuum breakage, impairing the cryostat and thus the cable efficiency, but also the cryogenic fluid infiltration into the cryostat, and thus its diffusion in the intermediate space (3a) where, preferably, thermal insulator is present that could be damaged.

In the system of the present invention, if the seal capacity of the inner a gasket of the cryostat inner tube weakens, the cryogenic fluid drawn from its flowing channel in between the two gasket wedges up the duct comprise therein between, thus scattering out in the environment external to the cryostat.

This dispersion into the environment is not challenging in view both of the kind of cryogenic fluid (helium, nitrogen, hydrogen, argo and mixtures thereof, in liquid or gaseous from, but preferably liquid nitrogen) which, at room temperature, goes back to its gaseous state, and of the duct structure. Actually, the latter is typically a tube with an extremely reduced diameter (smaller than 10 mm, preferably smaller than 4 mm) creating en epithermal environment wherein the fluid goes beyond its evaporation temperature.

In addition, the system of the present invention operates so as the more inner gasket of the inner tube works under a pressure difference lower than that between the intermediate space (3a) and the cryogenic fluid flowing channel.

As a fact, as just reported above, this pressure difference is of about 16,000 mbar, but said more inner gasket is, actually, at the interface between the cryogenic fluid flowing channel and the connection point of said duct. As said duct is in connection with the environment external to the cryostat or, alternatively, filled with nitrogen under slight overpressure, this zone is substantially under atmospheric pressure, thus the pressure difference which said more inner gasket has to bear is of about 15,000 mbar versus 16,000 mbar.

What is claimed is:

1. An electric power transport system comprising:
   at least a cold dielectric superconducting cable including two concentric phases of superconducting material electrically isolated one from the other by a dielectric and a first cryogenic fluid flowing channel inside the cable;
   a cryostat circumscribing a cryogenic fluid flowing channel, said channel containing said cable; and
   a cryogenic fluid,
   said cryostat comprising at least two modules, each comprising
   an inner tube, having at least a coupling flange for said at least two modules extending in a radially external direction; and
   an outer tube having a length not greater than the length of said inner tube;
   wherein at least one of said modules comprises
   at least a radially inner gasket and at least a radially outer gasket on the coupling surface of said at least one flange, the radially external perimeter of the inner gasket being spaced from the radially internal perimeter of the outer gasket; and
   at least a duct having a first end connected to said coupling surface of said at least one flange comprised between said gaskets and a second end connected to the environment external to the cryostat.

2. The electric power transport system according to claim 1, wherein said inner tube and outer tube are associated by spacers substantially adjacent to the extremities of at least said outer tube.

3. The electric power transport system according to claim 2, wherein said spacers and said inner and outer tubes define an under vacuum gap.

4. The electric power transport system according to claim 1, wherein said gaskets are housed in a slot present on the coupling surface of said at least one flange.

5. The electric power transport system according to claim 1, wherein said gaskets are each housed in a corresponding slot, respectively radially inner and outer slots, the inner slot having a radially outer diameter smaller than a radially inner diameter of the outer slot.

6. The electric power transport system according to claim 5, wherein said at least one slot has an axial right section selected between triangular and rhomboidal.

7. The electric power transport system according to claim 1, wherein both modules have said at least one slot in said at least one flange.

8. The electric power transport system according to claim 1, wherein said outer tube is flanged in radially external direction.

9. The electric power transport system according to claim 1, wherein said outer tube is provided with an axially external moving sleeve.

10. The electric power transport system according to claim 3, wherein said under vacuum gap contains thermal insulating material.

11. The electric power transport system according to claim 1, wherein said duct is metallic.

12. The electric power transport system according to claim 11, wherein said duct is in corrugated stainless steel.

13. The electric power transport system according to claim 1, wherein said duct has a diameter smaller than 10 mm.

14. The electric power transport system according to claim 13, wherein the diameter is smaller than 4 mm.

15. The electric power transport system according to claim 1, wherein said duct is coated with thermal insulating material.

16. The electric power transport system according to claim 1, wherein said duct is wound around said inner tube.

17. The electric power transport system according to claim 1, wherein at least one of said gaskets is in two halves.

18. The electric power transport system according to claim 1, wherein said duct is filled with an overpressure fluid.

19. A cryostat for a cold dielectric superconducting cable comprising at least two modules reciprocally coupled, each module comprising:
 an inner tube having at least a coupling flange for said at least two modules, extending in a radially external direction; and
 an outer tube having a length not greater than the length of said inner tube;
wherein at least one of said modules comprises
 at least a radially inner gasket and at least a radially outer gasket on the coupling surface of said at least one flange, the radially external perimeter of the inner gasket being spaced from the radially internal perimeter of the outer gasket, and
 at least a duct having a first end connected to said coupling surface of said at least one flange, comprised between said gaskets and a second end connected to the environment external to the cryostat.

20. The cryostat according to claim 19, wherein said at least two modules are coupled so as to create an intermediate space radially external to said inner tube of said two modules.

21. The cryostat according to claim 20, wherein said intermediate space is under vacuum.

22. The cryostat according to claim 20, wherein said intermediate space contains thermal insulating material.

* * * * *